(12) United States Patent
Hsu et al.

(10) Patent No.: US 8,352,642 B2
(45) Date of Patent: Jan. 8, 2013

(54) METHOD AND APPARATUS OF CONTROLLING AN OPERATIONAL STATUS OF AN ELECTRONIC DEVICE

(75) Inventors: Mu-Hsien Hsu, Tainan County (TW); Chih-Haur Huang, Tainan County (TW)

(73) Assignees: Himax Technologies Limited, Fonghua Village, Xinshi Dist., Tainan (TW); Himax Media Solutions, Inc., Fonghua Village, Xinshi Dist., Tainan (TW)

( * ) Notice: Subject to any disclaimer, the term of this patent is extended or adjusted under 35 U.S.C. 154(b) by 214 days.

(21) Appl. No.: 12/938,359

(22) Filed: Nov. 2, 2010

(65) Prior Publication Data

US 2012/0105732 A1 May 3, 2012

(51) Int. Cl.
*G06F 3/00* (2006.01)
*G06F 1/00* (2006.01)
*G06F 1/04* (2006.01)

(52) U.S. Cl. ............. 710/15; 710/18; 713/310; 713/502

(58) Field of Classification Search .................. None
See application file for complete search history.

(56) References Cited

U.S. PATENT DOCUMENTS 7,685,449 B2 * 3/2010 Terasawa ................ 713/323

OTHER PUBLICATIONS

High-Definition Multimedia Interface Specification; Jun. 22, 2006; HDMI Licensing, LLC; Version 1.3; p. 1-237.*

* cited by examiner

*Primary Examiner* — Idriss N Alrobaye
*Assistant Examiner* — Richard B Franklin
(74) *Attorney, Agent, or Firm* — Winston Hsu; Scott Margo (57) ABSTRACT

The present invention provides a method and apparatus of controlling an operational status of an electronic device which receives data through a HDMI port. The present invention determines whether to wake up the electronic device from the power saving mode according to counting numbers generated based on the transitions of signals within a time period.

10 Claims, 8 Drawing Sheets

METHOD AND APPARATUS OF CONTROLLING AN OPERATIONAL STATUS OF AN ELECTRONIC DEVICE

BACKGROUND OF THE INVENTION

1. Field of the Invention

The present invention relates generally to power saving, and more particularly to, a method and related apparatus for controlling an operational status of an electronic device and determine whether to wake up the electronic device in the power saving mode.

2. Description of the Prior Art

Power consumption is an important consideration when designing of modern electronic devices. In order to reduce power consumption, many electronic devices, such as portable devices, TVs, monitors, and the like, can operate in a normal mode and a power saving mode. In the power saving mode, most circuit components of the electronic device are temporarily shut down to reduce the power consumption. In this regards, a detect mechanism/circuit is needed to determine whether to wake up the electronic device from the power saving mode in order to re-activate the circuit components that are temporarily shut down, thereby configuring the electronic device to operate in the normal mode.

Some of the electronic devices, such as high definition multimedia interface (HDMI) appliances (e.g. HDMI sinks), use clock-detect mechanisms/circuits to determine whether to be woken up from the power saving mode if an external clock input is received (from HDMI sources). Once receiving the external clock input, the clock-detect mechanisms/circuits of the HDMI sinks may accordingly send an interrupt to a microcontroller to recover the function of a data decoder. The data decoder will determine whether any valid data is simultaneously received. If yes, it represents that the HDMI sinks needs to be operated in the normal mode for processing the valid data transmitted from the HDMI sources, and thus the HDMI sinks will be woken up.

However, in some cases, HDMI transmitters of the HDMI sources may send the HDMI sinks a meaningless clock signal on a clock channel of HDMI link coupled therebetween, but no valid data is received on data channel(s) of HDMI link by the HDMI sinks. This may be because the HDMI transmitter is interfered with noises or is improperly designed. In this situation, the data decoder may be mistakenly re-activated for decoding the data signals received in the data channel. However, since there is no valid data in the data chancel, it leads to unnecessary power consumption. Therefore, the conventional clock-detect mechanisms/circuits of waking up the electronic devices from the power saving mode have some advantages that need to be improved.

SUMMARY OF THE INVENTION

With this in mind, it is one objective of the present invention to provide a method and a related apparatus for controlling an operational status of an electronic device especially in the power saving mode. Compared to the conventional art, the present invention not only detects the clock signal, but also detects the data signal to enhance the accuracy of waking up determination. The conception of the present invention utilizes the number of transition of the received data in the data channel since in some of data transmission standard, such as HDMI standard, signals/data are usually transmitted in specific patterns. These specific patterns usually correspond to a certain number of transitions.

According to one exemplary embodiment of the present invention, a method of controlling an operational status of an electronic device is provided. Wherein, the electronic device receives data through HDMI port, and the HDMI port has a clock channel for receiving a clock signal and at least one data channel for receiving data including at least audio and video information. The method comprises: generating a checking result by counting a number of transitions of the received data in the data channel when the clock signal is detected and the electronic device is in a power saving mode; and determining whether to wake up the electronic device from the power saving mode according to the checking result.

According to one exemplary embodiment of the present invention, an apparatus of controlling an operational status of an electronic device is provided. Wherein, the electronic device receives data through HDMI port, and the HDMI port has a clock channel for receiving a clock signal and at least one data channel for receiving data including at least audio and video information. The apparatus comprises: a check unit and a control unit. The check unit is coupled to the clock channel and the at least one data channel, and configured to generate a checking result by counting a number of transitions of the received data in the data channel when the clock signal is detected and the electronic device is in a power saving mode. The control unit is coupled to the check unit, and configured to determine whether to wake up the electronic device from the power saving mode according to the checking result.

These and other objectives of the present invention will no doubt become obvious to those of ordinary skill in the art after reading the following detailed description of the preferred embodiment that is illustrated in the various figures and drawings.

DETAILED DESCRIPTION

In the following, the present invention will be described with reference to various exemplary embodiments. It will be clear that various modifications and changes may be made thereto without departing from the broader spirit and scope of the invention. Furthermore, the following descriptions of various embodiments of the present invention accompanying with the drawings are for illustrative purposes only and shall not be treated as a limitation to the scope of the present invention. Furthermore, similar components and elements are designated with same references in the accompanied drawings may be of similar functions and operations.

Moreover, certain terms are used throughout the following descriptions and claims to refer to particular system components. As one skilled in the art will appreciate, manufacturers may refer to a component by different names. This document does not intend to distinguish between components that differ in name but not differ in functionality. In the following discussion and in the claims, the terms "include", "including", "comprise", and "comprising" are used in an open-ended fashion, and thus should be interpreted to mean "including, but not limited to . . . " The terms "couple" and "coupled" are intended to mean either an indirect or a direct electrical connection. Thus, if a first device couples to a second device, that connection may be through a direct electrical connection, or through an indirect electrical connection via other devices and connections.

Figure 1:
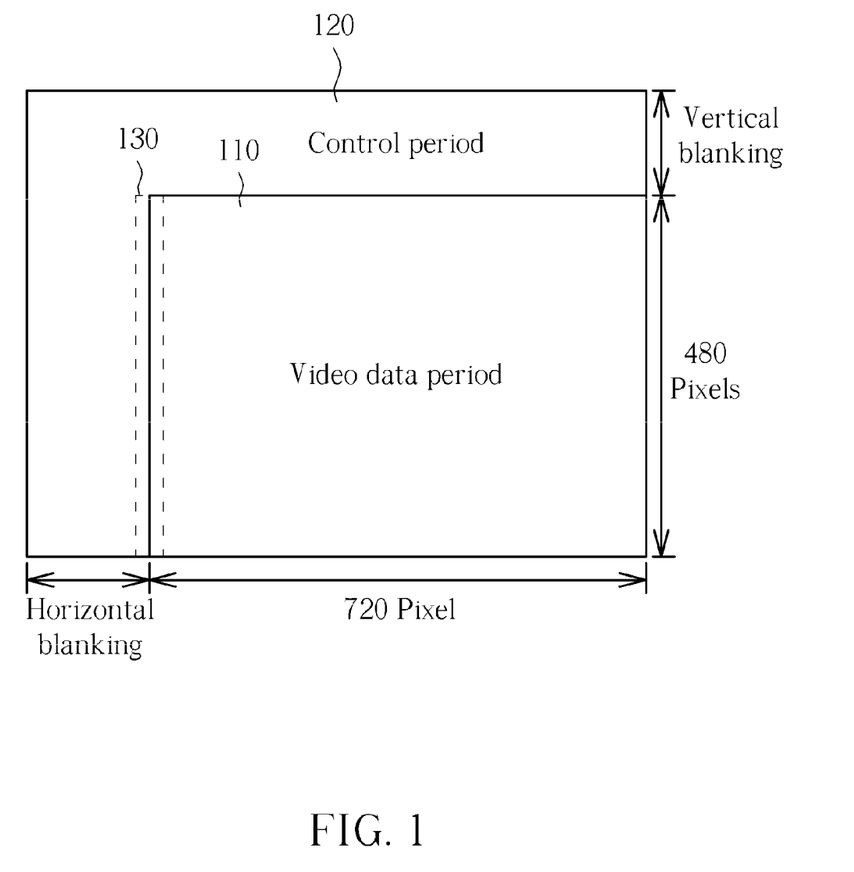
FIG. 1 is a diagram illustrating different operation periods of a HDMI link.

With reference to FIG. 1, a diagram is shown for explaining the main conception of the present invention. As can be seen from the diagram, during one frame time, an HDMI link may operate in video data period 110, or control period 120 (the region 120 further include data island period). During the video data period, the HDMI link transmits video data in the data channels from the HDMI source to the HDMI sink and during the control period, the HDMI link transmits control signals, such as HSYNC and VSYNC signals, from the HDMI source to the HDMI sink. In more detail, the control period further includes data island period for transmitting audio and auxiliary data. Since the HDMI link utilizes Transition Minimized Differential Signaling (TMDS), the number of transitions of the signal within a certain period (e.g. a certain number of clock cycles) is well controlled. For example, the control signals have a certain (or characteristic) number of transitions within one clock cycle (8 transitions in one clock cycle). However, signals of the video data do not have any certain number of transitions within one clock cycle (but must be lower than 8 transitions in one clock cycle). Hence, the present invention utilizes this difference between the control period and video data period to determine whether the data transmitted via the HDMI link corresponds to the control signals or the video data.

Figure 2:
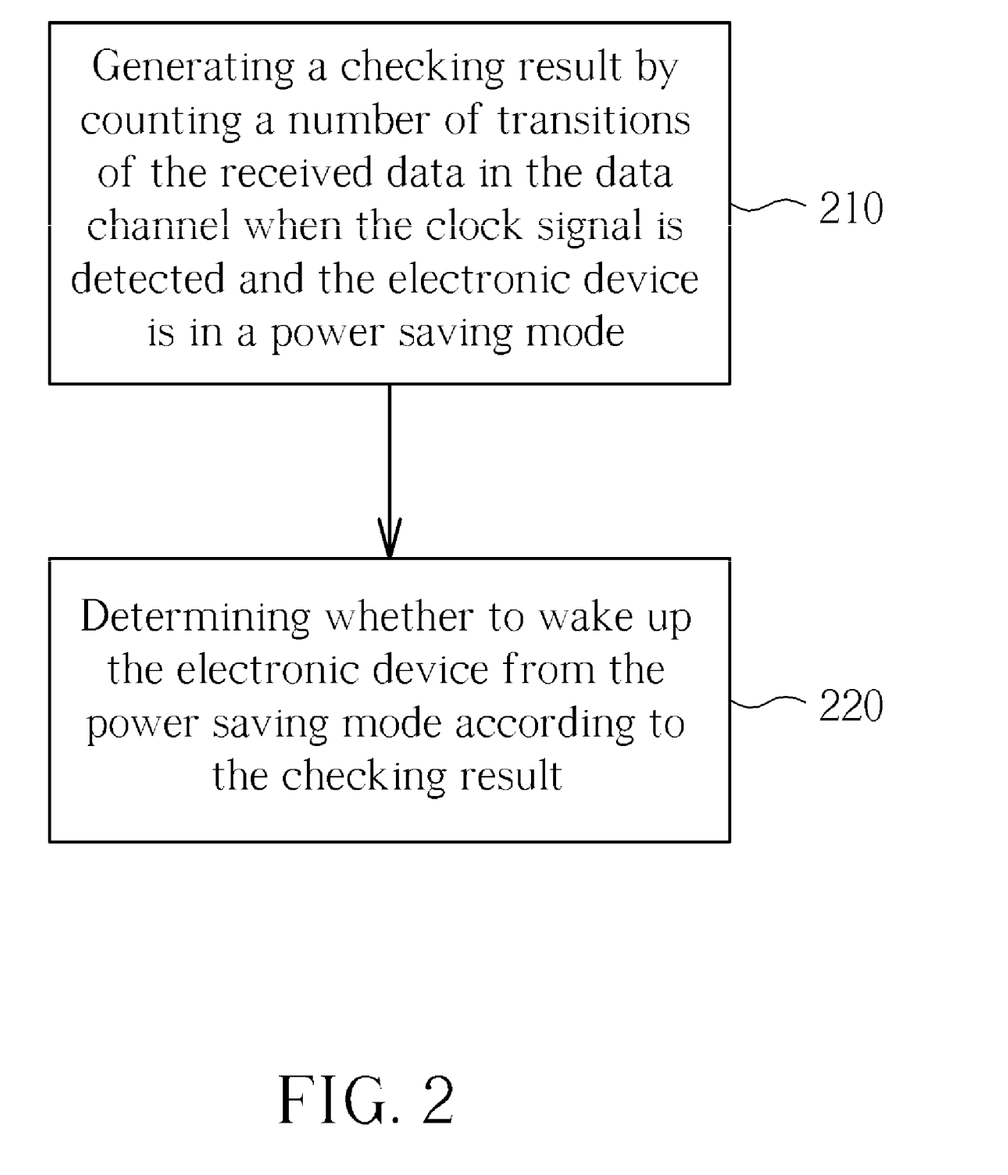
FIG. 2 is a flow chart illustrating a method of controlling an operational status of an electronic device according to one exemplary embodiment of the present invention.

If the HDMI link transmits the video data, the electronic device (i.e., HDMI sink) have to be woken up from the power saving mode for further processing (namely displaying) the video data. However, if the HDMI link transmits the control signals rather than the video data, the electronic device does not have to be woken up immediately. In other words, the electronic device remains in the power saving mode until the video data is received. To waking the electronic device in the most exact and proper timing (130 in FIG. 1), the present invention wakes up the electronic device from the power saving mode when the HDMI link is about to leave the control period and continues to enter in the video data period. That is, the electronic device will be woken up if the control signal is firstly received and then the video data is received The present invention utilizes the above-mentioned features of TMDS to determine whether to wake up an electronic device utilizing the HDMI link. With reference to FIG. 2, a flow chart of the inventive method according to one exemplary embodiment is illustrated in a broad view. As illustrated in FIG. 2, there are two steps 210 and 220 included therein. In step 210, a checking result is generated by counting a number of transitions of the received data in the data channel when the clock signal is detected and the electronic device is in a power saving mode. This is because the present invention uses the feature of TMDS transmission that during the control period, the number of transitions should be a certain value within a specific time period (e.g. a number of clock cycles). Therefore, it is necessary for the present invention to firstly check the number of transitions of the received data. Besides, the receipt of the clock signal is also necessary. This is because if the clock signal is not detected, the received data may be just resulted from noises.

Figure 4:
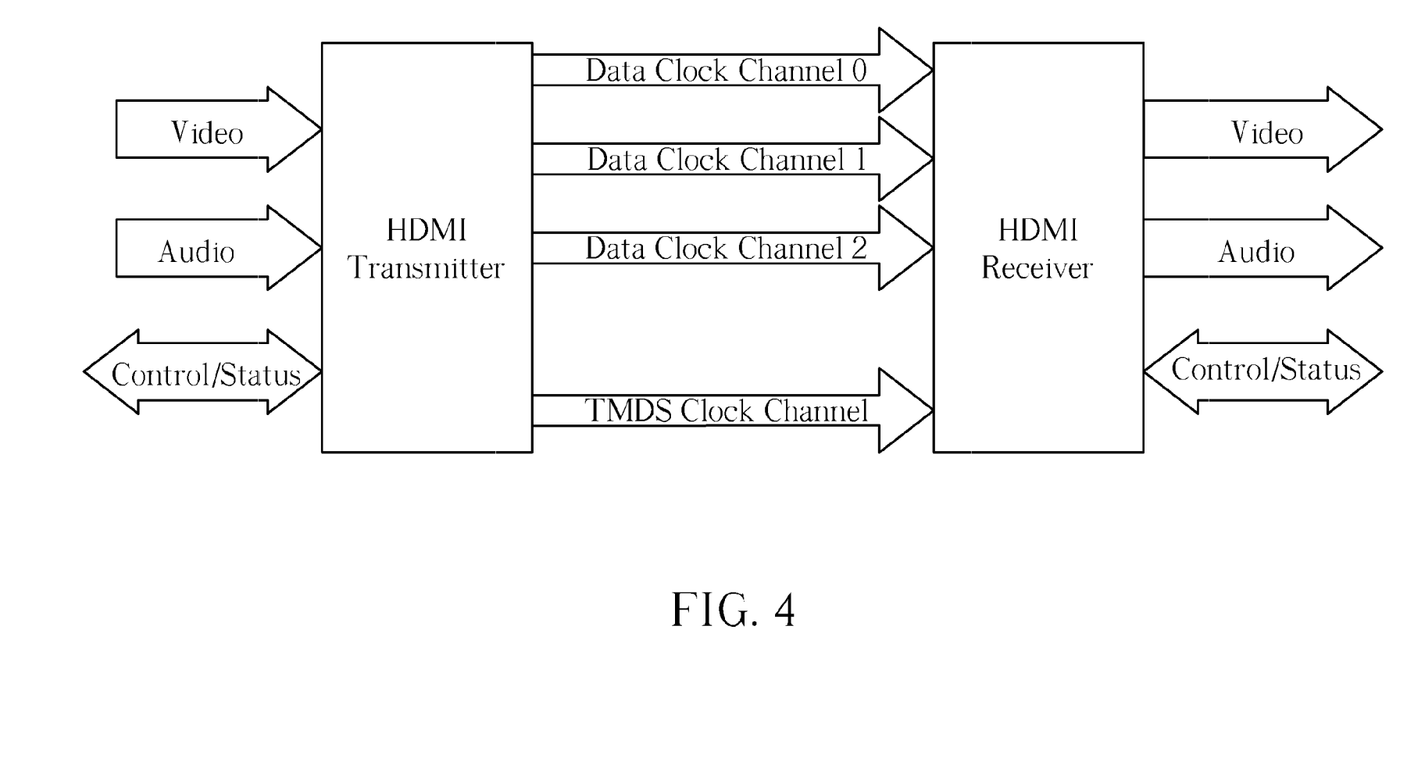
FIG. 4 is a block diagram illustrating channels of HDMI architecture.

In should be noted that although the HDMI link usually includes three data channel and one data channel (as illustrated in FIG. 4), the present invention, however, only needs to detect the transitions of the received data in at least one data channel and the clock signal in the clock channel. In other words, not all of the data channels need to be detected.

Hence, in this step 210, once the clock signal in the clock channel is detected, the number of transitions of the received data in the at least one data channel will be counted, thereby generating the checking result. Then, in step 220, according to the checking result generated in step 210, it is determined that whether the electronic device needs to be woken up from the power saving mode.

Figure 3:
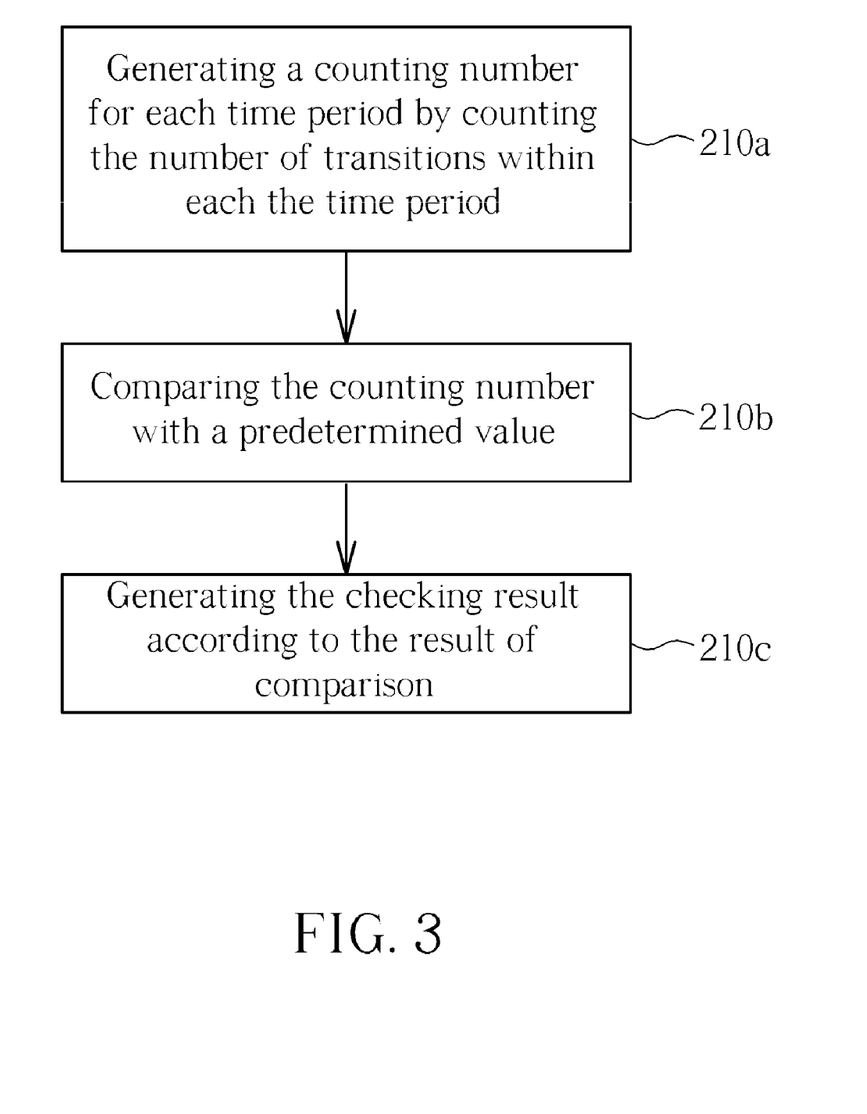
FIG. 3 is a flow chart illustrating detailed process of generating the checking result according to one exemplary embodiment of the present invention.

According to one exemplary embodiment, the step of generating the checking result (step 210) further comprises sub-steps of:

(210a) generating a counting number for each time period by counting the number of transitions within each the time period;

(210b) comparing the counting number with a predetermined value; and (210c) generating the checking result according to the result of comparison in the sub-step 210b.

The corresponding flow chart is illustrated in FIG. 3. The present invention will generate the counting number for each time period (210a). Then, in step 220b, the counting number will be compared with the predetermined value which is the certain number of transitions as mentioned above (e.g. 8 times the number of clock cycles) and accordingly generate the checking results (210c). In the case of HDMI link, the predetermined value is probably 8 or the number of 8 times depending on the length of each time period.

Figure 5:
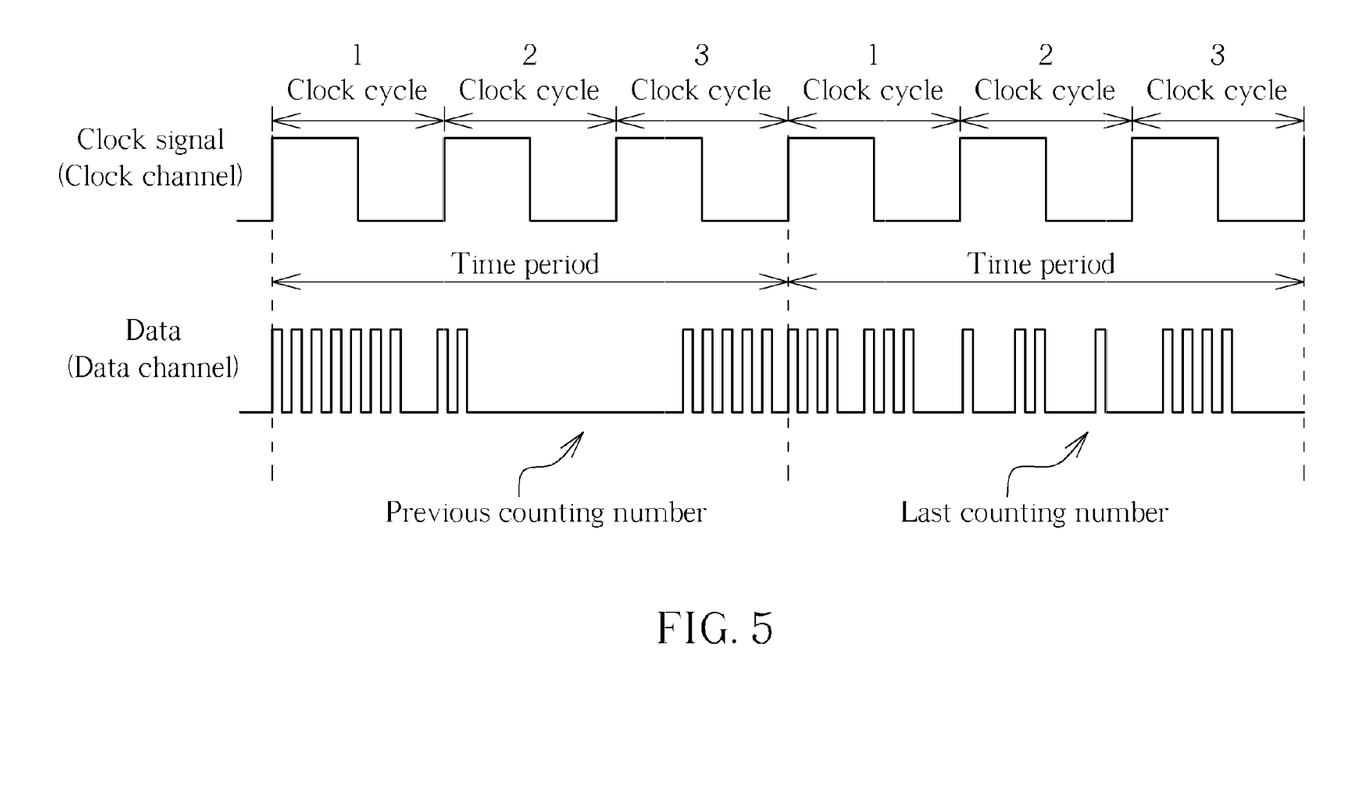
FIG. 5 is a waveform plot illustrating the relationship between clock cycles and counting numbers according to one exemplary embodiment of the present invention.

In one preferred exemplary embodiment, the determination of waking up the electronic device is made according to at least two counting numbers. Specifically, the electronic device is woken up when the checking result indicates that the previous counting number is equal to the predetermined value and the last counting number is smaller than the predetermined value. This represents that the previous counting number corresponds to the receipt of control signals and the last counting number corresponds to the receipt of the video data, and hence the HDMI link is about to leave the control period and enter in the video data period. The relationship between the clock signal and the last counting number and the immediately previous counting number is illustrated in FIG. 5. As illustrated in FIG. 5, the previous and the last counting numbers are respectively generated for every several clock cycles (e.g. time period having 3 clock cycles). As a result, when the previous and the last counting numbers respectively meet the abovementioned conditions, the electronic device needs to be woken up for processing the received data. Besides, it should be noted that there may be other counting numbers between the previous counting number and the last counting number. If these counting numbers are all equal to the predetermined values, the electronic device will not be woken up. This is because such condition means that the HDMI line remains in the control period, and is not about to enter the video data period.

Figure 6:
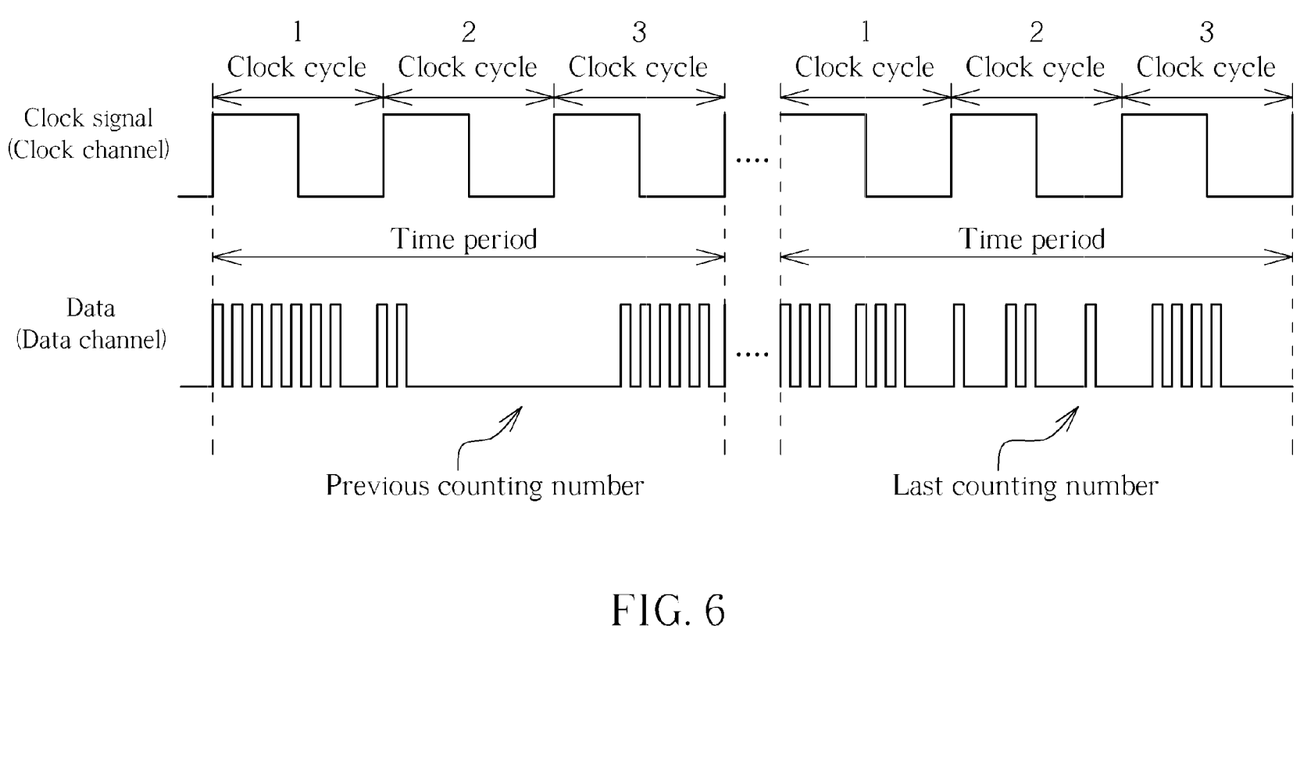
FIG. 6 is a waveform plot illustrating the relationship between clock cycles and counting numbers according to another exemplary embodiment of the present invention.

Moreover, in some exemplary embodiments of the present invention, the counting numbers are not continuously generated. In other words, after a first counting number is generated, a second counting number will not be immediately generated, which can save more power consumption during the power saving mode. The relationship between the clock signal and the previous counting number and the last counting numbers is illustrated in FIG. 6. Such operation can further reduce the power consumption by decreasing the operating frequency of a check unit for generating the counting number.

Figure 7:
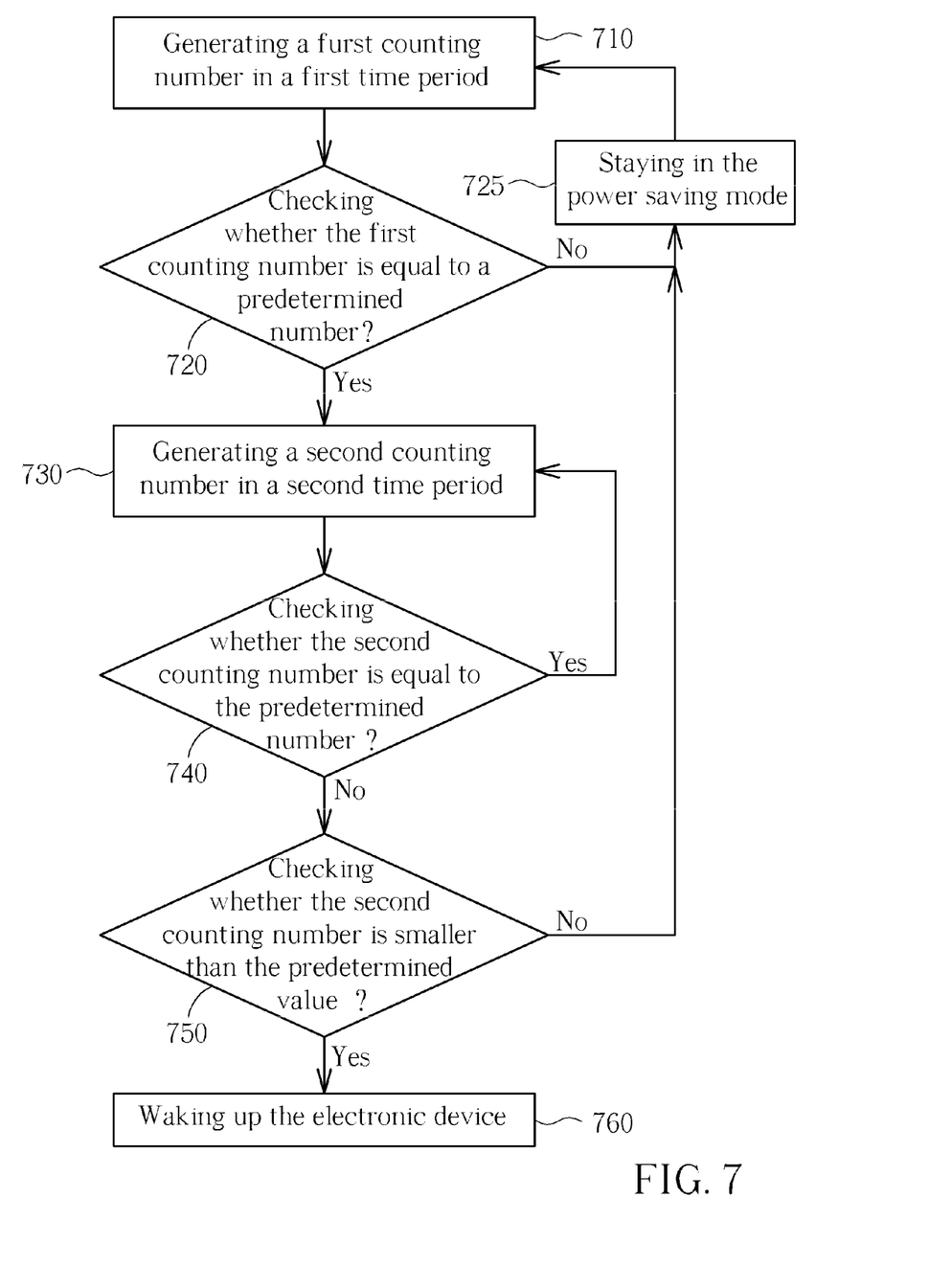
FIG. 7 is a flow chart illustrating a method of controlling an operational status of an electronic device according to a particular embodiment.

The following part takes a practical implementation as an example for clarity the conception of the present invention. However, the present invention is not restricted in scope to this practical implementation. A flow chart of the practical implementation according to the abovementioned inventive method is illustrated in FIG. 7. In step 710, a first counting number (e.g. previous counting number) is generated in a first time period (e.g. 64 clock cycles). Then, in step 720, it is checked whether the first counting number is equal to a predetermined number (e.g. 64*8) in order to check whether the HDMI link is in control period). If yes, step 730 is entered for further checking whether the HDMI link is about to enter the video data period; otherwise, step 725 is entered in which the electronic device remains in the power saving mode. In step 730, a second counting number (e.g. last counting number) is generated in a second time period following the first time period or having an interval period between the first and second time period. Then, in step 740, it is checked whether the second counting number is equal to the predetermined number (if the length of the second time period is identical to that of the first time period). However, if the length of the second time period is not identical to that of the first time period, the second counting number is compared with another value. If the result is yes, the flow goes back to step 730 to generate the next counting number mediately or immediately in which the electronic device remains in the power saving mode since the HDMI link still remains in the control period and thus the electronic device does not need to be woken up; otherwise, step 750 is entered, and the second counting number is checked whether to be smaller than the predetermined value. Only when the second counting number is smaller than the predetermined value, it represents that the HDMI link enters the video data period and thus the electronic device needs to be woken up from the power saving mode.

Figure 8:
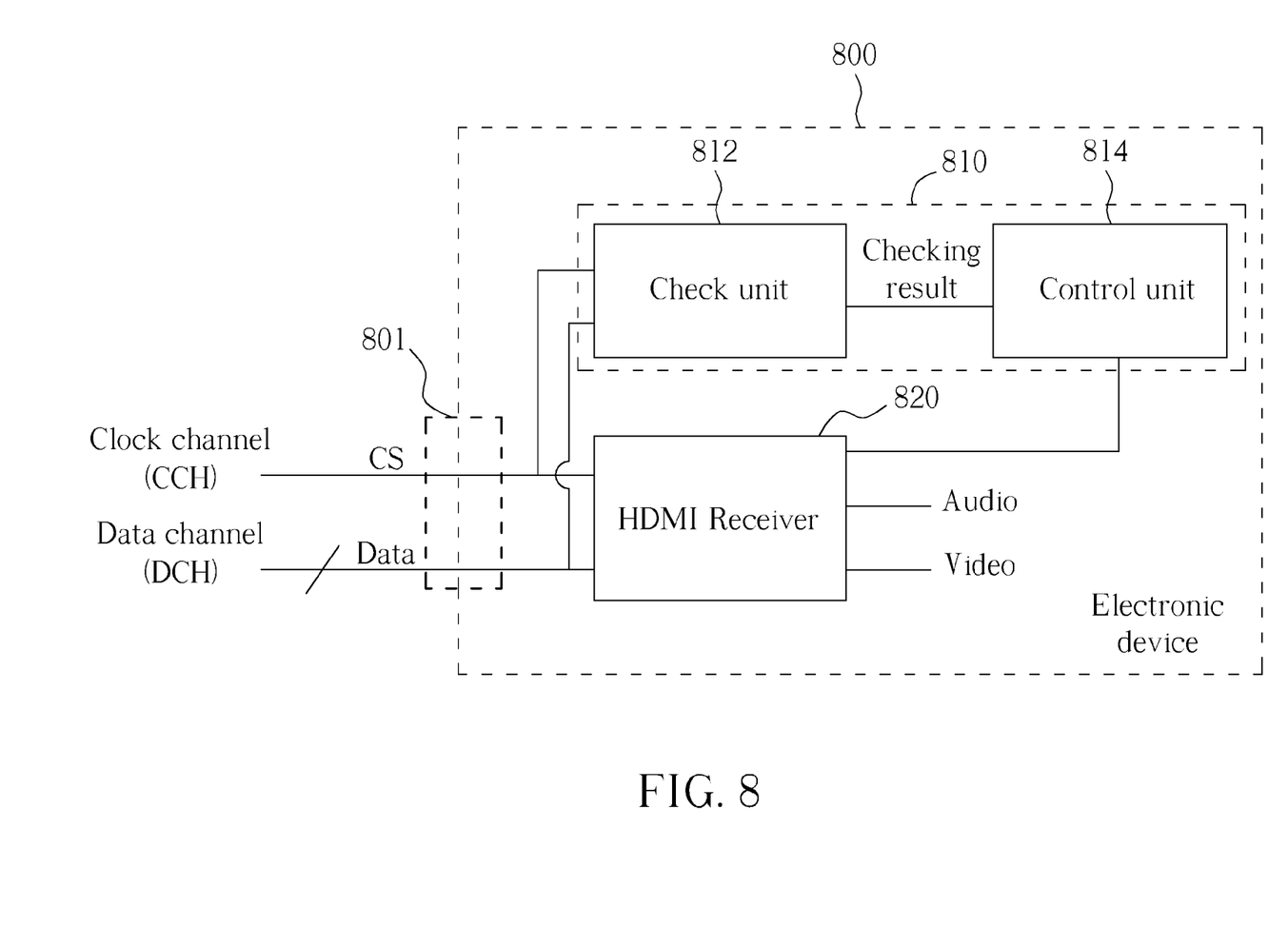
FIG. 8 is a block diagram illustrating an apparatus of controlling an operational status of an electronic device according to one exemplary embodiment of the present invention.

Based on the abovementioned method, the present invention further provides a corresponding hardware apparatus. The inventive apparatus is utilized for controlling an operational status of an electronic device as well. As illustrated in FIG. 8, an electronic device 800 includes (but not limited to): the inventive apparatus 810 and a HDMI receiver 820. In should be noted that the electronic device 800 may further includes more additional block such as power supply circuits, processing circuits, decoding circuit, storage circuits, and the like. These circuits may be deactivated when the electronic device 800 is in the power saving mode and will be reactivated when the electronic device 800 is woken up from the power saving mode.

The electronic device 800 receives data through HDMI port 801, wherein the HDMI port 801 has a clock channel CCH for receiving a clock signal CS and at least one data channel DCH for receiving data including at least audio and video information. The audio and video information may be processed by the processing circuits inside the electronic device 800.

The inventive apparatus 810 comprises a check unit 812 and a control unit 814. The check unit 812 is coupled to the clock channel CCH and the at least one data channel DCH, and configured to generate a check result by counting a number of transitions of the received data in the data channel DCH when the clock signal CS is detected. In addition, the inventive apparatus 810 may be operated while the electronic device 800 is in power saving mode. The control unit 814 is coupled to the check unit 812, and configured to determine whether to wake up the electronic device 800 from the power saving mode according to the checking result. It should be noted that the inventive apparatus may be incorporated in the HDMI receiver 820 or other circuits in the electronic device 800. The check unit 812 generates a counting number for each time period by counting the number of transitions within each the time period, compares the counting number with a predetermined value and generates the checking result according to the result of comparison.

Additionally, the control unit 814 wakes up the electronic device 800 when the checking result generated by the check unit 812 indicates that the previous counting number is equal to the predetermined value and the last counting number is smaller than the predetermined value. Preferably, the previous counting number is the second to the last counting number.

The detailed operations and conception regarding the inventive apparatus 810 is similar to those included in the abovementioned method and exemplary embodiments, so it is omitted here for the sake of brevity. The inventive apparatus also includes all the technical features as described in the description paragraphs regarding the inventive method.

Reference in the specification to "one exemplary embodiment" or "an exemplary embodiment" means that a particular feature, structure, or characteristic described in connection with the embodiment is included in at least an implementation. The appearances of the phrase "in one exemplary embodiment" in various places in the specification are not necessarily all referring to the same embodiment.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

In conclusion, the present invention provides a better detection mechanism/circuit of waking up determination for the electronic devices especially HDMI appliances. As the present invention detects the clock signal in the clock channel and the data in the data channel as well, the mistaken determination can be therefore avoided.

Those skilled in the art will readily observe that numerous modifications and alterations of the device and method may be made while retaining the teachings of the invention.

What is claimed is:

1. A method of controlling an operational status of an electronic device, wherein the electronic device receives data through HDMI port, wherein the HDMI port has a clock channel for receiving a clock signal and at least one data channel for receiving data including at least audio and video information, comprising:

generating a checking result by counting a number of transitions of the received data in the data channel when the clock signal is detected and the electronic device is in a power saving mode, comprising:

generating a counting number for each time period by counting the number of transitions within each the time period;

comparing the counting number with a predetermined value; and generating the checking result according to the result of comparison; and determining whether to wake up the electronic device from the power saving mode according to the checking result.

2. The method of claim 1, wherein the step of determining whether to wake up the electronic device from the power saving mode comprises:

waking up the electronic device when the checking result indicates that the previous counting number is equal to the predetermined value and the last counting number is smaller than the predetermined value.

3. The method of claim 2, wherein the previous counting number is the second to the last counting number.

4. The method of claim 1, the predetermined value is integer times of eight.

5. The method of claim 1, each the time period is integer times of a clock cycle of the clock signal.

6. An apparatus of controlling an operational status of an electronic device, wherein the electronic device receives data through HDMI port, wherein the HDMI port has a clock channel for receiving a clock signal and at least one data channel for receiving data including at least audio and video information, comprising:

a check unit, coupled to the clock channel and the at least one data channel, for generating a checking result by counting a number of transitions of the received data in the data channel when the clock signal is detected and the electronic device is in a power saving mode, wherein the check unit generates a counting number for each time period by counting the number of transitions within each the time period; compares the counting number with a predetermined value; and then generates the checking result according to the result of comparison; and a control unit, coupled to the check unit, for determining whether to wake up the electronic device from the power saving mode according to the checking result.

7. The apparatus of claim 6, wherein the control unit wakes up the electronic device when the checking result generated by the check unit indicates that the previous counting number is equal to the predetermined value and the last counting number is smaller than the predetermined value.

8. The apparatus of claim 7, wherein the previous counting number is the second to the last counting number.

9. The apparatus of claim 6, the predetermined value is integer times of eight.

10. The apparatus of claim 6, each the time period for which the check unit generates the counting number is integer times of a clock cycle of the clock signal.

* * * * *